US007014826B2

(12) United States Patent
Iizuka

(10) Patent No.: US 7,014,826 B2
(45) Date of Patent: Mar. 21, 2006

(54) METHOD FOR PRODUCING CUBIC BORON NITRIDE AND PRODUCT OBTAINED THROUGH THE METHOD

(75) Inventor: Makoto Iizuka, Shiojiri (JP)

(73) Assignee: Showa Dendo K.K., Tokyo (JP)

( * ) Notice: Subject to any disclaimer, the term of this patent is extended or adjusted under 35 U.S.C. 154(b) by 47 days.

(21) Appl. No.: 10/344,645

(22) PCT Filed: Mar. 27, 2002

(86) PCT No.: PCT/JP02/02987

§ 371 (c)(1),
(2), (4) Date: Feb. 13, 2003

(87) PCT Pub. No.: WO02/076906

PCT Pub. Date: Oct. 3, 2002

(65) Prior Publication Data

US 2003/0170161 A1 Sep. 11, 2003

Related U.S. Application Data

(60) Provisional application No. 60/280,749, filed on Apr. 3, 2001.

(30) Foreign Application Priority Data

Mar. 27, 2001 (JP) ............................. 2001-089029

(51) Int. Cl.
C01B 21/064 (2006.01)
(52) U.S. Cl. .................................................... 423/290
(58) Field of Classification Search ................. 423/290
See application file for complete search history.

(56) References Cited

U.S. PATENT DOCUMENTS 3,078,232 A * 2/1963 Wentorf ............... 252/62.3 GA
3,772,428 A 11/1973 Showa
4,287,164 A * 9/1981 Endo et al. ................. 423/290
4,409,193 A * 10/1983 Sato et al. .................. 423/290
4,469,802 A * 9/1984 Endo et al. ................. 501/96.4
4,545,968 A * 10/1985 Hirano et al. .............. 423/290

(Continued)

FOREIGN PATENT DOCUMENTS

JP          61-283 B2      1/1985

(Continued)

OTHER PUBLICATIONS

Patent Abstracts of Japan, abstracting JP-A-60-005007, dated Jan. 11, 1985, corresponding to JP-B2-61-283.

(Continued)

Primary Examiner—Wayne A. Langel
(74) Attorney, Agent, or Firm—Sughrue Mion, PLLC

(57) ABSTRACT

A method for producing cubic boron nitride includes maintaining hexagonal boron nitride in the presence of a catalyst substance under conditions where cubic boron nitride remains thermodynamically stable to thereby transform hexagonal boron nitride into cubic boron nitride, wherein the catalyst substance contains $LiMBN_2$, in which M represents Ca, Sr, Ba, Ra, Be, or Mg, and at least one species selected from the group consisting of alkali metals, alkaline earth metals, nitrides thereof and boronitrides thereof. Any one of the $LiMBN_2$, alkali metals, alkaline earth metals, nitrides thereof and boronitrides thereof has an oxygen content of 1% or less. As a result, the percent transformation into cubic boron nitride can be considerably enhanced, and the cubic boron nitride obtained exhibits high mechanical strength.

12 Claims, 1 Drawing Sheet

U.S. PATENT DOCUMENTS

| | | | | |
|---|---|---|---|---|
| 4,551,316 A | * | 11/1985 | Iizuka | 423/290 |
| 4,772,575 A | * | 9/1988 | Ota et al. | 501/96.4 |
| 5,618,509 A | * | 4/1997 | Shioi et al. | 423/290 |
| 5,837,214 A | * | 11/1998 | Shioi et al. | 423/290 |
| 6,071,841 A | * | 6/2000 | Sumiya | 501/96.4 |
| 6,248,303 B1 | * | 6/2001 | Shioi et al. | 423/290 |

FOREIGN PATENT DOCUMENTS

| JP | 5-94 B2 | 1/1986 |
|---|---|---|
| JP | 5-95 B2 | 2/1986 |

OTHER PUBLICATIONS

Patent Abstracts of Japan, abstracting JP-A-61-017405, dated Jan. 25, 1986, corresponding to JP-B2-5-94.

Patent abstracts of Japan, abstracting JP-A-61-031306, dated Feb. 13, 1986, corresponding to JP-B2-5-95.

* cited by examiner

METHOD FOR PRODUCING CUBIC BORON NITRIDE AND PRODUCT OBTAINED THROUGH THE METHOD

CROSS REFERENCE TO RELATED APPLICATIONS

This Application is an application filed under 35 U.S.C. §111(a) claiming the benefit pursuant to 35 U.S.C. §119(e)(1) of the filing date of Provisional Application Ser. No. 60/280,749 filed Apr. 3, 2001 pursuant to 35 U.S.C. §111(b).

TECHNICAL FIELD

The present invention relates to a method for producing cubic boron nitride from hexagonal boron nitride, to cubic boron nitride obtained through the method, and a grindstone formed of the cubic boron nitride.

BACKGROUND ART

Cubic boron nitride is second to diamond in hardness and has higher chemical stability than diamond. Thus, cubic boron nitride is increasingly employed as grinding material, polishing material and cutting material. A variety of methods for producing cubic boron nitride have been proposed. Among them, best known and most widely employed in the industrial field is a method in which hexagonal boron nitride is maintained in the presence of a catalyst substance under conditions where cubic boron nitride remains thermodynamically stable (approximately 4.0 to 6.0 Gpa and approximately 1400 to 1600° C.) to thereby transform hexagonal boron nitride into cubic boron nitride. U.S. Pat. No. 3,772,428 and JP-B SHO 61-283, JP-B HEI 5-94 and JP-B HEI 5-95 disclose, as a catalyst substance, alkali metals, alkaline earth metals, nitrides thereof and boronitrides thereof. More specifically, U.S. Pat. No. 3,772,428 discloses $Li_3N$ and $Li_3BN_2$ as particularly promising catalyst substances. However, cubic boron nitride produced by use of any one of these catalyst substances generally assumes the form of microparticles having a size of 50 μm or less and contains insufficiently grown crystal planes. Thus, abrasives produced from such cubic boron nitride have not yet attained satisfactory performance.

JP-B SHO 61-283 discloses $LiCaBN_2$ as a promising catalyst substance. Cubic boron nitride produced by use of the catalyst substance generally has a quasi-spherical shape and exhibits excellent mechanical strength. JP-B HEI 5-94 and JP-B HEI 5-95 disclose a method in which a mixture of $LiMBN_2$ (M represents an alkaline earth metal) with $Li_8SiN_4$ or $Ca_5Si_2N_6$ is used as a catalyst substance. Cubic boron nitride obtained through the method has a well-grown (111) crystal plane and exhibits excellent mechanical strength.

However, these methods have not yet attained satisfactory percent transformation of hexagonal boron nitride into cubic boron nitride. Thus, a catalyst substance that attains high percent transformation is desired in industrial process. In addition, higher mechanical strength of the catalyst substance is also desired.

An object of the present invention is to solve the problems residing in the aforementioned conventional techniques and to provide cubic boron nitride improved in mechanical strength and a grindstone having enhanced grinding performance.

Another object of the invention is to provide a method for producing cubic boron nitride that enhances percent transformation of hexagonal boron nitride to cubic boron nitride.

DISCLOSURE OF THE INVENTION

The invention is directed to a method for producing cubic boron nitride, comprising maintaining hexagonal boron nitride in the presence of a catalyst substance under conditions where cubic boron nitride remains thermodynamically stable to thereby transform hexagonal boron nitride into cubic boron nitride, wherein the catalyst substance contains $LiMBN_2$, in which M represents Ca, Sr, Ba, Ra, Be, or Mg, and at least one species selected from the group consisting of alkali metals, alkaline earth metals, nitrides thereof and boronitrides thereof.

Any one of the $LiMBN_2$, alkali metals, alkaline earth metals, nitrides thereof and boronitrides thereof has an oxygen content of 1% or less.

The $LiMBN_2$ is $LiCaBN_2$ or $LiBaBN_2$.

The nitrides of alkali metals include nitrides of Na, K, Rb, Cs and Fr, and the nitrides of alkaline earth metals include nitrides of Ra, Be and Mg.

The boronitrides of alkali metals include $Li_3BN_2$, and the boronitrides of alkaline earth metals include $Ca_3B_2N_4$ and $Mg_3B_2N_4$.

The catalyst substance preferably contains $LiCaBN_2$ and $Li_3BN_2$.

The at least one species selected from the group consisting of alkali metals, alkaline earth metals, nitrides thereof and boronitrides thereof has an amount ratio of 0.3 to 20 parts by mol based on 1 part by mol of $LiMBN_2$.

The catalyst substance is added in an amount falling within a range of 5 to 50 parts by mass to 100 parts by mass of the hexagonal boron nitride to form a mixture, and the mixture is maintained under conditions where cubic boron nitride remains thermodynamically stable to thereby transform hexagonal boron nitride into cubic boron nitride.

The invention is directed also to cubic boron nitride produced through the method and to a grinding stone produced using the cubic boron nitride.

According to the method of the invention for producing cubic boron nitride, the percent transformation of hexagonal boron nitride to cubic boron nitride far exceeds 50% in contrast with the conventional percent transformation of around 30%. In addition, since the cubic boron nitride obtained exhibits high shape anisotropy, the mechanical strength thereof is improved. The grindstone produced from the cubic boron nitride is considerably excellent in grinding performance as compared with conventional grindstones.

BEST MODE FOR CARRYING OUT THE INVENTION

Figure 1:
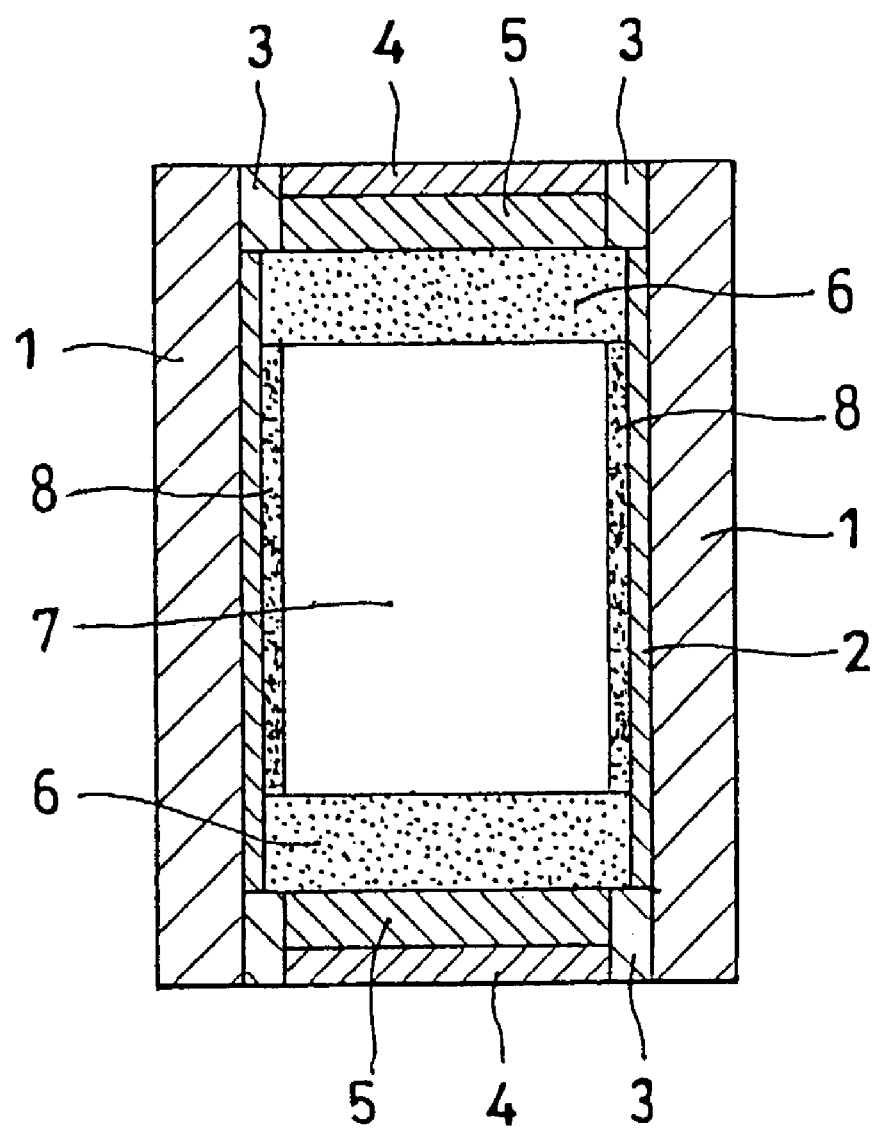
FIG. 1 is a schematic cross-sectional view of a reactor employed for transforming hexagonal boron nitride into cubic boron nitride.

The present invention relates to a method for producing cubic boron nitride, comprising maintaining hexagonal boron nitride in the presence of a catalyst substance under conditions where cubic boron nitride remains thermodynamically stable to thereby transform hexagonal boron nitride into cubic boron nitride. In one mode for carrying out the production method of the present invention, hexagonal boron nitride powder is mixed with a catalyst substance, and the mixture is compressed under pressure (e.g., 1 to 2 t/cm²) into a compact. The compact is placed in a container provided in an ultra-high-pressure generator and maintained under conditions where cubic boron nitride remains thermodynamically stable (approximately 4 to 6 GPa, approximately 1400 to approximately 1600° C.) for a predetermined period (e.g., approximately 1 second to 6 hours) to thereby transform hexagonal boron nitride into cubic boron nitride. After this transformation, the thus-synthesized ingot is removed from the ultra-high-pressure generator, and cubic boron nitride is isolated from the ingot and purified.

In the present invention, commercial hexagonal boron nitride powder may be used as the hexagonal boron nitride starting material. However, hexagonal boron nitride powder having a low oxygen content is preferably used, since oxygen impurities which migrate in the form of oxides such as boron oxide often retard transformation of hexagonal boron nitride into cubic boron nitride. Specifically, hexagonal boron nitride powder having an oxygen content of 1% or less is preferably used. Regarding the particle size of hexagonal boron nitride powder, the maximum particle size is preferably 100 $\mu$m or less. Excessively large particle sizes are not preferable, since such particle sizes deteriorate reactivity of hexagonal boron nitride with a catalyst substance, leading to deterioration in percent transformation of hexagonal boron nitride into cubic boron nitride.

The catalyst substance that is used in the present invention contains $LiMBN_2$ and at least one species (other than $LiMBN_2$) selected from the group consisting of alkali metals, alkaline earth metals, nitrides thereof and boronitrides thereof. The symbol "M" of $LiMBN_2$ represents Ca, Sr, Ba, Ra, Be, or Mg. Of these, Ca and Ba are particularly preferable. In addition, $LiMBN_2$ having a low oxygen impurity content is preferable. Particularly, $LiMBN_2$ preferably has an oxygen content of 1% or less, more preferably 0.5% or less. Oxygen impurities are not preferable, since they retard transformation of hexagonal boron nitride into cubic boron nitride.

Although no particular limitation is imposed on the particle size of $LiMBN_2$, in general, the maximum particle size is preferably 100 $\mu$m or less. Excessively large particle sizes are not preferable, since such particle sizes deteriorate reactivity of $LiMBN_2$ with hexagonal boron nitride, leading to deterioration in percent transformation of hexagonal boron nitride into cubic boron nitride.

Taking $LiCaBN_2$ as an example, a method for synthesizing $LiMBN_2$ used in the present invention will be described. Firstly, powders of lithium nitride, calcium nitride and hexagonal boron nitride are used as starting materials. These powders are mixed such that the compositional proportion of (lithium nitride):(calcium nitride):(hexagonal boron nitride) by mol is adjusted to 1:1:3. The mixture is maintained in an atmosphere of inert gas, such as nitrogen or argon, at approximately 1000° C. for about 40 minutes, and then cooled to thereby obtain a $LiCaBN_2$.solid. The $LiCaBN_2$ solid is pulverized in an inert gas atmosphere to thereby yield $LiCaBN_2$ powder.

The catalyst substance employed in the present invention must contain both $LiMBN_2$ and at least one species selected from the group consisting of alkali metals, alkaline earth metals, nitrides thereof and boronitrides thereof. The nitrides and boronitrides of alkali metals or alkaline earth metals must be selected from species other than the $LiMBN_2$ contained in the catalyst substance.

Specifically, the alkali metals include Li, Na, K, Rb, Cs and Fr. Particularly, when Li is employed, cubic boron nitride of excellent mechanical strength can be produced at higher percent transformation.

Examples of the alkaline earth metals include Ca, Sr, Ba, Ra, Be and Mg. Particularly, when Ca or Mg is employed, cubic boron nitride of excellent mechanical strength can be produced at higher percent transformation.

Examples of the alkali metal nitrides include $Li_3N$, $Na_3N$, $K_3N$, $Rb_3N$, $Cs_3N$ and $Fr_3N$. Particularly, when $Na_3N$, $K_3N$, $Rb_3N$, $Cs_3N$ or $Fr_3N$ is employed, cubic boron nitride of excellent mechanical strength can be produced at higher percent transformation.

Examples of the alkaline earth metal nitrides include $Ca_3N_2$, $Sr_3N_2$, $Ba_3N_2$, $Ra_3N_2$, $Be_3N_2$ and $Mg_3N_2$. Particularly, when $Ra_3N_2$, $Be_3N_2$ or $Mg_3N_2$ is employed, cubic boron nitride of excellent mechanical strength can be produced at higher percent transformation.

Examples of the alkali metal boronitrides include $Li_3BN_2$, $Na_3BN_2$, $K_3BN_2$, $Rb_3BN_2$, $Cs_3BN_2$ and $Fr_3BN_2$. Particularly, when $Li_3BN_2$ is employed, cubic boron nitride of excellent mechanical strength can be produced at higher percent transformation.

Examples of the alkaline earth metal boronitrides include $Ca_3B_2N_4$, $Sr_3B_2N_4$, $Ba_3B_2N_4$, $Ra_3B_2N_4$, $Be_3B_2N_4$ and $Mg_3B_2N_4$. Particularly, when $Ca_3B_2N_4$ or $Mg_3B_2N_4$ is employed, cubic boron nitride of excellent mechanical strength can be produced at higher percent transformation.

The alkali metals, alkaline earth metals, nitrides thereof and boronitrides thereof that are used in the present invention preferably have a low impurity concentration. Particularly, presence of oxygen serving as an impurity causes a severe adverse effect. Thus, the oxygen impurity content is preferably controlled to 1% or less, more preferably 0.5% or less. An oxygen-content of higher than 1% deteriorates crystallinity of cubic boron nitride to be produced.

No particular limitation is imposed on the particle size of the alkali metals, alkaline earth metals, nitrides thereof and boronitrides thereof that are used in the present invention. However, in general, the maximum particle size thereof is preferably 100 $\mu$m or less, since excessively large particle sizes deteriorate reactivity thereof with hexagonal boron nitride.

The catalyst substance that is used in the present invention particularly preferably contains $LiCaBN_2$ and one of Li, Ca, Mg, $Na_3N$, $K_3N$, $Rb_3N$, $Cs_3N$, $Fr_3N$, $Ra_3N_2$, $Be_3N_2$, $Mg_3N_2$, $Li_3BN_2$, $Ca_3B_2N_4$ and $Mg_3B_2N_4$ in combination. Among these combinations, use of $LiCaBN_2$ and $Li_3BN_2$ in combination is most preferable. When this combination is employed, cubic boron nitride of excellent mechanical strength can be produced at the highest percent transformation.

In the present invention, control is imposed on the ratio of the amount of the substance containing at least one species selected from the group consisting of alkali metals, alkaline earth metals, nitrides thereof and boronitrides thereof to that of $LiMBN_2$. Specifically, based on 1 part by mol of $LiMBN_2$, alkali metals, alkaline earth metals, nitrides thereof and boronitrides thereof are used in a total amount of preferably 0.3 to 20 parts by mol, more preferably 0.3 to 10 parts by mol. When the total amount of alkali metals, alkaline earth metals, nitrides thereof and boronitrides thereof is less than 0.3 parts by mole, effect of these compounds is attained only insufficiently and percent transformation of hexagonal boron nitride into cubic boron nitride lowers, whereas when the total amount is in excess of 20 parts by mol, the rate of formation of cubic boron nitride increases excessively to thereby deteriorate mechanical strength and shape characteristics, leading to deterioration in performance of abrasives.

The aforementioned catalyst substance is prepared by mixing powder of $LiMBN_2$ with powder of at least one species selected from the group consisting of alkali metals, alkaline earth metals, nitrides thereof and boronitrides thereof. Alternatively, the catalyst substance may be prepared by mixing an alkali metal, an alkaline earth metal and nitrides thereof are mixed at a target compositional proportion and heating the resultant mixture at, for example, 700 to 1,200° C. in an atmosphere of inert gas, such as nitrogen or argon.

The present invention employs, as a catalyst substance, $LiMBN_2$ and at least one species selected from the group consisting of alkali metals, alkaline earth metals, nitrides thereof and boronitrides thereof. These substances are mixed with hexagonal boron nitride, and the resultant mixture is maintained under conditions where cubic boron nitride remains thermodynamically stable to thereby transform hexagonal boron nitride into cubic boron nitride. Alternatively, a substance, such as an alkali metal, an alkaline earth metal, a nitride thereof or a boronitride thereof, is mixed with hexagonal boron nitride, then the resultant mixture is maintained under conditions where cubic boron nitride remains thermodynamically stable and, at this stage, $LiMBN_2$ and at least one species selected from the group consisting of alkali metals, alkaline earth metals, nitrides thereof and boronitrides thereof are incorporated into the mixture.

In connection with the proportion of the aforementioned catalyst substance used in the present invention, the catalyst substance is added in an amount of preferably 5 to 50 parts by mass, more preferably 10 to 30 parts by mass, to 100 parts by mass of hexagonal boron nitride. When the amount of the catalyst substance is less than 5 parts by mass or in excess of 50 parts by mass, the mechanical strength and shape characteristics of cubic boron nitride being formed are deteriorated, leading to deterioration in performance of abrasives produced from the cubic boron nitride.

As a method of the preparation of a mixture of the catalyst substance and hexagonal boron nitride, their powders are preferably mixed together. Alternatively, hexagonal boron nitride layers and catalyst substance layers may be placed in a reactor such that these layers are alternately stacked. More specifically, in a preferable mode, hexagonal boron nitride and a catalyst substance are mixed together or shaped separately at about 1 to 2 t/cm², and the resultant mixture is or compacts are charged into a reactor. Through employment of this method, manageability of raw material powders is improved and shrinkage of the raw materials occurring in the reactor lowers, thereby enhancing productivity.

In another alternative method, cubic boron nitride seed crystals are added in advance to the aforementioned mixture or compacts to thereby promote growth of cubic boron nitride, with the seed crystals as crystallization nuclei. Needless to say, this method also falls within the scope of the present invention. In this case, the seed crystals may be coated with the catalyst substance.

The aforementioned compact is charged into a reactor, and the reactor is placed in a known high-temperature/high-pressure-generator, where the compact is maintained under temperature/pressure conditions where cubic boron nitride remains thermodynamically stable. The thermodynamically stable conditions are described in Diamond Relat. Mater., 9, (2000), 7–12 by O. Fukunaga. No particular limitation is imposed on the time during which the compact is maintained, and the compact is typically maintained for about 1 second to 6 hours.

By maintaining the compact under thermodynamically stable conditions, hexagonal cubic boron nitride is transformed into cubic boron nitride. In general, a synthesis ingot containing hexagonal boron nitride, cubic boron nitride and a catalyst substance is yielded. The thus-yielded synthesis ingot is disintegrated for isolating and purifying cubic boron nitride. A method for isolation and purification described in JP-B SHO 49-27757 may be employed. In one method, the yielded synthesis ingot is disintegrated into granules of a size of 5 mm or less, and sodium hydroxide and a small amount of water are added to the granules. The mixture is heated to about 320° C. to thereby selectively dissolve hexagonal boron nitride. The mixture is cooled, and undissolved matter is washed with acid and separated through filtration to thereby yield cubic boron nitride.

The cubic boron nitride thus obtained is classified into predetermined particle-size classes specified by JIS-B4130. The boron nitride particles belongint to the class of 100/120 are used as abrasive particles to which a bonding material and a binder are mixed. The resultant mixture is pressure-shaped and fired at around 1000° C. to form a grindstone. The thus-obtained grindstone is greatly improved in grinding performance as compared with conventional grindstones.

The working examples of the present invention will be described. However, the present invention is not limited to these working examples.

WORKING EXAMPLES 1 TO 10

To 100 parts by mass of hexagonal boron nitride powder having a mean particle size of 10 μm and containing 0.8% of oxygen impurity and 0.2% of other impurities, 10 parts by mass of each catalyst substance having a composition shown in Table 1 below was added. In Table 1, the ratio of (1):(2) refers to the ratio of 1 part by mol of $LiMIBN_2$ to the total parts by mol of alkali metals, alkaline earth metals, nitride thereof and boronitrides thereof (other than $LiMBN_2$). The mixtures were compressed at 1.5 t/cm² into compacts having a diameter of 26 mm and a height of 32 mm, and each compact was placed in a reactor as shown in FIG. 1.

TABLE 1

|  | Catalyst substance (1) | Catalyst substance (2) | Oxygen content of (1) (%) | Oxygen content of (2) (%) | (1):(2) | Percent transformation (%) | Toughness value (%) | Shape anisotropy |
|---|---|---|---|---|---|---|---|---|
| Ex. 1 | $LiCaBN_2$ | Li | 0.37 | 0.12 | 1:5 | 51 | 64 | 1.85 |
| Ex. 2 | $LiCaBN_2$ | $Li_3N$ | 0.37 | 0.26 | 1:5 | 59 | 62 | 1.81 |
| Ex. 3 | $LiCaBN_2$ | $Li_3BN_2$ | 0.37 | 0.24 | 1:7 | 56 | 64 | 1.80 |
| Ex. 4 | $LiCaBN_2$ | $Ca_3B_2N_4$ | 0.37 | 0.21 | 1:7 | 52 | 67 | 1.84 |
| Ex. 5 | $LiCaBN_2$ | $Li_3BN_2$—$Ca_3B_2N_4$ | 0.37 | 0.24–0.21 | 1:2:5 | 51 | 63 | 1.84 |
| Ex. 6 | $LiCaBN_2$ | Mg | 0.37 | 0.18 | 1:5 | 58 | 63 | 1.82 |
| Ex. 7 | $LiBaBN_2$ | $Li_3BN_2$ | 0.38 | 0.24 | 1:7 | 42 | 59 | 1.86 |

TABLE 1-continued

|  | Catalyst substance (1) | Catalyst substance (2) | Oxygen content of (1) (%) | Oxygen content of (2) (%) | (1):(2) | Percent transformation (%) | Toughness value (%) | Shape anisotropy |
|---|---|---|---|---|---|---|---|---|
| Ex. 8 | LiBaBN$_2$ | Ca$_3$B$_2$N$_4$ | 0.38 | 0.21 | 1:7 | 47 | 57 | 1.88 |
| Ex. 9 | LiCaBN$_2$ | K$_3$N | 0.37 | 0.26 | 1:5 | 50 | 67 | 1.81 |
| Ex. 10 | LiCaBN$_2$ | Mg$_3$N$_2$ | 0.37 | 0.22 | 1:5 | 55 | 64 | 1.83 |
| Comp. Ex. 1 | LiCaBN$_2$ | — | 0.37 | — | 1:0 | 32 | 49 | 1.91 |
| Comp. Ex. 2 | Li$_3$BN$_2$ | — | 0.24 | — | 1:0 | 22 | 35 | 1.75 |
| Comp. Ex. 3 | Ca$_3$B$_2$N$_4$ | — | 0.21 | — | 1:0 | 23 | 38 | 1.74 |
| Comp. Ex. 4 | Mg | — | 0.18 | — | 1:0 | 29 | 30 | 1.70 |
| Comp. Ex. 5 | LiCaBN$_2$ | Li$_8$SiN$_4$ | 0.37 | 0.17 | 1:0.04 | 32 | 55 | 1.88 |
| Comp. Ex. 6 | LiCaBN$_2$ | Ca$_5$Si$_2$N$_6$ | 0.37 | 0.15 | 1:0.03 | 32 | 54 | 1.89 |

The reactor shown in FIG. 1 has a hollow, cylindrical outer wall 1 which is made of pyrophyllite serving as a pressure medium and in which a graphite-made, hollow cylindrical heater 2 is provided in contact with the inner surface of the outer wall and a pyrophyllite member 8 serving as a separator member is provided on the surface of the heater. Upper and lower current-carrying steel rings 3 and top and bottom current-carrying steel plates 4 are provided in the top and bottom, respectively, of the reactor. Sintered alumina plates 5 are provided under the top and bottom steel plates, and two pyrophyllite plates 6 serving as pressure media are provided under the top steel plate and the upper ring and on the bottom steel plate and the lower ring. The pyrophyllite plates 6 and pyrophylite members 8 define an accommodation chamber 7 for housing raw material.

The reactor was placed in an ultra-high-pressure generator, and the ten compacts were treated under pressure of 5 GPa at 1450° C. for 10 minutes.

After completion of the treatment, each resultant synthesized ingot was removed from the ultra-high-pressure generator, and a portion of the synthesis ingot was disintegrated into granules of a size of 5 mm or less. Sodium hydroxide and a small amount of water were added to the granules, and the mixture was heated to about 320° C. and then cooled. The cooled mixture was washed with acid and subjected to filtration to thereby isolate purified cubic boron nitride.

For the purpose of analysis, another portion of the synthesis ingot was pulverized by use of a mortar, and the resultant powder was subjected to X-ray analysis by means of an X-ray powder diffraction apparatus to thereby determine the relative intensity of cubic boron nitride (111) diffraction ray (with respect to CuKα rays) and that of hexagonal boron nitride (002) diffraction ray (with respect to CuKα rays). From the measurements, percent transformation of hexagonal boron nitride into cubic boron nitride was calculated on the basis of the following formula:

{(intensity attributed to cubic boron nitride)/(intensity attributed to cubic boron nitride+intensity attributed to hexagonal boron nitride)}×100(%).

The mechanical strength of the thus-produced cubic boron nitride was evaluated by means of a toughness index. The toughness index was obtained in the following manner. Specifically, the particle size of the produced cubic boron nitride was adjusted to a particle size class of 120/140, specified by JIS-B4130. A predetermined amount of the sample and a steel ball were placed in a capsule having a volume of 2 ml. The capsule was subjected to vibration using a vibrator for 30.0±0.3 seconds at frequency of 3000±100/minute to thereby pulverize with the steel ball the cubic boron nitride large particles contained in the capsule. The resultant powder was allowed to pass through a 90-μm-sieve. The sample matter remaining on the sieve was weighed, and the weight obtained was expressed in the form of a percentage based on the entire weight of the powder yielded through the pulverization.

The shape anisotropy of the thus-produced cubic boron nitride was evaluated on the basis of bulk specific weight. To be specific, the shape anisotropy was calculated by dividing the bulk specific weight of the produced cubic boron nitride by true density of cubic boron nitride (3.48 g/cm$^3$) It is evaluated that when the obtained value is small, the shape anisotropy is high, whereas when the obtained value is large, the shape anisotropy is low.

The percent transformation, toughness value and shape anisotropy of the synthesis ingot obtained in each working example were as shown in Table 1 above.

COMPARATIVE EXAMPLES 1 TO 6

Each of the catalyst substances having the compositions shown in Table 1 above was added to hexagonal boron nitride. The mixtures were treated under the same conditions as in Working Examples 1 to 10 using the same reactor as in Working Examples 1 to 10 to obtain synthesis ingots. The percent transformation, toughness value and shape anisotropy of each ingot were obtained. The results are as shown in Table 1 above.

The cubic boron nitrides produced in comparative examples assume crystals of a comparatively spherical shape. In contrast, through the method of the present invention, crystals having anisotropy in shape (i.e., deviation from roundness to a slender or flat shape) can be readily produced. The grinding tools, cutting tools, etc. produced using the crystals of such a high anisotropy in shape exhibited high grinding or cutting performance. In the majority of working examples, the percent transformation exceeded 50%. In comparative examples, however, it merely reached around 30%.

WORKING EXAMPLE 11 AND COMPARITIVE EXAMPLE 7

Each of the cubic boron nitrides produced through the method of Example 1 and that of Comparative Example 1 was classified into particle size classes specified by JIS-B4130. A grinding stone segment was produced using the abrasive belonging to a particle size class of 100/120. Specifically, 50 vol. % of an abrasive, 18 vol. % of a borosilicate glass binding material serving as a binding agent and 20 vol. % of a binder (phenolic resin) were mixed. The resultant mixture was press-formed at 150° C., and the resultant compact was fired at 1000° C. in the atmosphere. The employed binder burns during the firing for producing a grinding stone segment to form pores. The thus-produced grinding stone segment was bonded to an aluminum alloy substrate to thereby form a grinding stone, and the grinding stone was subjected to a grinding test under the following conditions.

| | |
|---|---|
| Grinding wheel: | 1A1 type, 180D × 5U × 3X × 76.2H |
| Grinding machine: | Horizontal-spindle surface grinding machine (grinding wheel spindle motor: 3.7 kW) |
| Workpiece: | SKD-11 (HRc = 62 to 64) |
| Surface area of workpiece: | 200 mm × 100 mm |
| Method of grinding: | Wet surface traverse grinding |
| Grinding conditions: | |
| Grinding wheel peripheral velocity: | 1800 m/min. |
| Table speed: | 15 m/min. |
| Feed per cross rail: | 2 mm/pass |
| Depth of cut: | 25 μm |
| Grinding fluid: | |
| JIS W2, exclusively for cBN (×50 diluted) | |
| Feed amount: | 9 L/min |

The results of evaluation of the abrasives produced in Example 1 and Comparative Example 1 are shown respectively as Working Example 11 and Comparative Example 7 in Table 2 below. In Table 2 below, the "grinding ratio" refers to a value obtained by dividing the volume of a workpiece that was ground with the grinding stone by the volume of the grinding stone worn off, and the "grinding power" refers to electric power consumed by a grinding machine during grinding. In other words, the higher the grinding ratio or the lower the grinding power, the more excellent the grinding performance of the grinding stone.

TABLE 2

| | Grinding ratio | Grinding power (W) |
|---|---|---|
| Example 11 | 1282 | 464 |
| Comp. Ex. 7 | 1215 | 507 |

INDUSTRIAL APPLICABILITY

According to the present invention, hexagonal boron nitride can be transformed into cubic boron nitride having satisfactory mechanical strength, and sufficient percent transformation of hexagonal boron nitride into cubic boron nitride can be attained. The thus-produced cubic boron nitride has high shape anisotropy and can be used in the production of a variety of abrasives for which sharp cutting quality is required.

The invention claimed is:

1. A method for producing cubic boron nitride, comprising maintaining hexagonal boron nitride in the presence of a catalyst substance under conditions where cubic boron nitride remains thermodynamically stable to thereby transform hexagonal boron nitride into cubic boron nitride, wherein the catalyst substance contains $LiMBN_2$, in which M represents Ca, Sr, Ba, Ra, Be, or Mg, and at least one species selected from the group consisting of alkali metals, alkaline earth metals, nitrides thereof and boronitrides thereof and wherein the at least one species has an amount ratio of 5.0 to 20 parts by mol based on 1part by mol of the $LiMBN_2$.

2. The method according to claim 1, wherein the $LiMBN_2$ has an oxygen content of 1% or less.

3. The method according to claim 1, wherein the at least one species has an oxygen content of 1% or less.

4. The method according to claim 1, wherein the $LiMBN_2$ is $LiCaBN_2$ or $LiBaBN_2$.

5. The method according to claim 1, wherein the at least one species is at least a nitride of Na, K, Rb, Cs or Fr.

6. The method according to claim 1, wherein the at least one species is at least a nitride of Ra, Be or Mg.

7. The method according to claim 1, wherein the at least one species is at least a nitride of Mg.

8. The method according to claim 1, wherein the at least one species is at least $Li_3BN_2$.

9. The method according to claim 1, wherein the at least one species is at least $Ca_3B_2N_4$ or $Mg_3B_2N_4$.

10. The method according to claim 1, wherein the at least one species is at least $Ca_3B_2N_4$.

11. The method according to claim 1, wherein the catalyst substance contains $LiCaBN_2$ and $Li_3BN_2$.

12. The method according to claim 1, wherein the catalyst substance is added in an amount falling within a range of 5 to 50 parts by mass to 100 parts by mass of the hexagonal boron nitride to form a mixture, and the mixture is maintained under conditions where cubic boron nitride remains thermodynamically stable to thereby transform hexagonal boron nitride into cubic boron nitride.

* * * * *